(12) United States Patent
Marcus et al.

(10) Patent No.: US 11,484,767 B2
(45) Date of Patent: Nov. 1, 2022

(54) VISUAL AID TIMER SYSTEM AND METHOD OF USING THE SAME

(71) Applicants: Melissa Marcus, Lakemoor, IL (US); Donald Marcus, Jr., Bloomingdale, IL (US)

(72) Inventors: Melissa Marcus, Lakemoor, IL (US); Donald Marcus, Jr., Bloomingdale, IL (US)

(*) Notice: Subject to any disclaimer, the term of this patent is extended or adjusted under 35 U.S.C. 154(b) by 0 days.

(21) Appl. No.: 16/984,822

(22) Filed: Aug. 4, 2020

(65) Prior Publication Data
US 2021/0121764 A1 Apr. 29, 2021

Related U.S. Application Data

(60) Provisional application No. 62/925,637, filed on Oct. 24, 2019.

(51) Int. Cl.
| | | |
|---|---|---|
| *A63B 71/06* | (2006.01) | |
| *G03B 21/12* | (2006.01) | |
| *G06T 13/80* | (2011.01) | |
| *G06M 3/06* | (2006.01) | |

(52) U.S. Cl.
CPC .......... *A63B 71/0622* (2013.01); *G03B 21/12* (2013.01); *G06M 3/06* (2013.01); *G06T 13/80* (2013.01); *A63B 2071/0625* (2013.01); *A63B 2071/0641* (2013.01)

(58) Field of Classification Search
CPC ......... G04F 10/00; H04N 5/232; A63B 71/00; G04B 47/00
See application file for complete search history.

(56) References Cited

U.S. PATENT DOCUMENTS

| | | |
|---|---|---|
| 3,980,868 A | 9/1976 | Thompson |
| 4,632,570 A | 12/1986 | Kelsey |
| 4,949,320 A | 8/1990 | Karrenberg |
| 6,212,135 B1 | 4/2001 | Schreiber |
| 7,570,153 B2 | 8/2009 | Gorman et al. |
| 8,317,659 B2 | 11/2012 | Woodson |
| 8,867,319 B2 | 10/2014 | Keith |
| 9,067,121 B1 | 6/2015 | Beard et al. |
| 9,266,006 B2 | 2/2016 | Herold |
| 10,437,200 B1 * | 10/2019 | Ostler ................. G04G 9/0017 |
| 10,525,318 B2 | 1/2020 | Dougherty |
| 2003/0087220 A1 | 5/2003 | Bessette |
| 2004/0008589 A1 * | 1/2004 | McMillan ............... G04F 1/005 368/223 |

(Continued)

FOREIGN PATENT DOCUMENTS

GB 2169112 A 7/1986

*Primary Examiner* — Eugene L Kim
*Assistant Examiner* — Christopher Glenn
(74) *Attorney, Agent, or Firm* — Scherrer Patent & Trademark Law, P.C.; Stephen T. Scherrer; Monique A Morneault

(57) ABSTRACT

Visual aid timer systems comprise a visual aid timer that may be displayed to users, and synchronized to an audible alert signal providing expirations of time intervals and/or indications of start and/or stop times in a plurality of intervals used in physical fitness training and/or testing. The visual aid timer system provides a visual indication of time remaining in each of the plurality of intervals for viewing by users thereof. Methods of using the same are further provided.

8 Claims, 3 Drawing Sheets

(56) References Cited

U.S. PATENT DOCUMENTS

| | | | |
|---|---|---|---|
| 2004/0066709 A1* | 4/2004 | Morykwas | H04N 21/42204 348/E5.103 |
| 2004/0145114 A1* | 7/2004 | Ippolito | G04F 10/00 368/96 |
| 2006/0197684 A1 | 9/2006 | Tremblay | |
| 2006/0226959 A1* | 10/2006 | Gorman | G07C 1/28 340/323 R |
| 2010/0331145 A1* | 12/2010 | Lakovic | G04G 21/02 482/8 |
| 2011/0218765 A1* | 9/2011 | Rogers | G04F 10/00 368/107 |
| 2012/0075959 A1* | 3/2012 | Keith | G04F 3/08 368/10 |
| 2015/0309480 A1* | 10/2015 | Patton | G04F 3/06 368/109 |
| 2016/0330362 A1* | 11/2016 | Singleton | G04G 11/00 |
| 2018/0001182 A1 | 1/2018 | Szanto | |
| 2019/0356941 A1 | 11/2019 | Sullivan | |

* cited by examiner

VISUAL AID TIMER SYSTEM AND METHOD OF USING THE SAME

CROSS-REFERENCE TO RELATED APPLICATIONS

The present invention claims priority to U.S. Prov. Pat. App. No. 62/925,637, titled "Customizable Visual Aid Timer," filed Oct. 24, 2019, which is incorporated herein by reference in its entirety.

TECHNICAL FIELD

The present invention relates to a visual aid timer system. Specifically, the visual aid timer system comprises a visual aid timer that may be displayed to users, and synchronized to an audible alert signal providing expirations of time intervals and/or indications of start and/or stop times in a plurality of intervals used in physical fitness training and/or testing. The visual aid timer system provides a visual indication of time remaining in each of the plurality of intervals for viewing by users thereof. Methods of using the same are further provided.

BACKGROUND

More than two-thirds of people categorize themselves as "visual" or "spatial" learners. This means that they understand information effectively when content is paired with visual aids. According to a study done by North Carolina State University Professor Richard M. Felder, 85% of engineering students at North Caroline State University fell into the category of "visual" learners.

As over half of the population prefer to learn information using visual aids, there are also groups of people who rely solely on visual aids to understand information—specifically, individuals with hearing impairments. In schools, children with hearing impairments struggle to learn information that is presented without specific accommodations for hearing impaired individuals. Indeed, within the subject of physical education, many of the tasks and tests require the ability to discern audible signals.

Specifically, in a physical education training and testing methodology commonly known as the PACER test, an individual must move between two points that are a specific distance from each other within time intervals. The timed intervals can remain the same, or be extended or compressed. Typically, the timed intervals become shorter over time, making the advancement from one internal to the next more and more difficult. The timed intervals are typically given to users thereof in a series of audible beeps or tones.

Individuals with hearing impairments are oftentimes at a disadvantage compared to others without hearing impairments. Indeed, how can hearing impaired students function in a gymnasium when activities rely solely on audible signals? Hearing impaired students often report that it is difficult to keep up with other students in interval training activities, as well as other standardized fitness training and testing, because they simply cannot hear audible cues to change or continue activities.

While many hearing impaired students may have translators or aides, typically individuals that help translate audible signals to visual cues, many students desire independence from others to accomplish tasks.

Moreover, even students that are not hearing impaired often have difficulty with interval training based on audible signals and cues. This is so because while the audible cue may provide a "start" and a "stop" signal for an activity, it is difficult to glean how much time may be left within a particular interval. Thus, for example, in PACER testing, when a student must move from one point to another over the timed interval, the student does not typically know how long the interval may be. Even when intervals are consistent, it can be difficult to glean an amount of time left in an interval for the user to move from the one point to the other. The test continues until the student fails to move to the other point within the allotted time of the particular interval. Knowing how much time is left in an interval would aid in regulating pace throughout the test, leading to higher test scores.

A need, therefore, exists for improved visual aid timer systems and methods of using the same for use in physical interval training and testing. Specifically, a need exists for improved visual aid timer systems and methods of using the same that provide visual signals to users thereof that are synchronized to audible signals. More specifically, a need exists for improved visual timer systems that further provide a representation of time remaining within each interval.

Moreover, a need exists for improved visual aid timer systems and methods of using the same that may be utilized effectively by individuals that are hearing impaired, allowing them to participate in interval training that was heretofore only audible. Further, a need exists for improved visual aid timer systems and methods of using the same that allows users to have a visual understanding of time remaining within each interval. Still further, a need exists for improved visual aid timer systems and methods of using the same that more effectively allows users to pace themselves and obtain higher scores.

SUMMARY OF THE INVENTION

The present invention relates to a visual aid timer system. Specifically, the visual aid timer system comprises a visual aid timer that may be displayed to users, and synchronized to an audible alert signal providing expirations of time intervals and/or indications of start and/or stop times in a plurality of intervals used in physical fitness training and/or testing. The visual aid timer system provides a visual indication of time remaining in each of the plurality of intervals for viewing by users thereof. Methods of using the same are further provided.

To this end, in an embodiment of the present invention, a system for fitness training and/or testing is provided. The system comprises: a visual representation of each of a plurality of timed intervals generating and displayed via a first display apparatus; an audio apparatus for providing an audible signal of an end or a start of each of the plurality of timed intervals; and a control apparatus for displaying the visual representation and the audible signal synchronized together, wherein the visual representation of each of the plurality of timed intervals comprises an icon, wherein the icon simultaneously shows time elapsed and time left within each of the timed intervals.

In an embodiment, the visual representation of each of the plurality of timed intervals is generated by a device selected from the group of a projector, a monitor and a television.

In an embodiment, the system further comprises: a first point marked within a fitness space; and a second point marked within the fitness space, wherein a distance between the first point and the second point is the distance a participant is required to run within each timed interval within a fitness training or testing event.

In an embodiment, the system further comprises: a second display, wherein the second display is configured to generate the visual representation of each of the plurality of timed intervals, wherein the first display is configured to display the visual representation of each of the time intervals near the first point marked within the fitness space, wherein the second display is configured to display the visual representation of each of the time intervals near the second point marked within the fitness space, and wherein a participant running toward the first point is capable of viewing the visual representation of each of the plurality of time intervals via the first display and the participant running toward the second point is capable of viewing the visual representation of each of the plurality of time intervals via the second display.

In an embodiment, the first display is a first projector and the second display is a second projector.

In an embodiment, the first projector projects the visual representation onto a first wall and the second projector projects the visual representation onto a second wall.

In an embodiment, the audio apparatus comprises a speaker.

In an embodiment, the control apparatus is selected from the group of a computer and a DVD player.

In an embodiment, the plurality of timed intervals are sub-divided into a plurality of levels, wherein each of the plurality of levels has a sub-set plurality of time intervals, wherein each of the timed intervals in each level are of the same duration.

In an embodiment, the visual representation of each of the timed intervals comprises an animation selected from the group of a circle animation and a bar animation.

In an alternate embodiment of the present invention, a method of signaling time intervals in fitness interval training or testing is provided. The method comprises the steps of: providing a first video display for displaying a visual representation of each of a plurality of timed intervals; providing an audio apparatus for providing an audible signal of an end or a start of each of the plurality of timed intervals; and providing a control apparatus for displaying the visual representation and the audible signal synchronized together, displaying the visual representation of each of the intervals on the first video display and producing the audible signal on the audio apparatus, wherein the audible signal is synchronized with the visual representation of each of the timed intervals, and wherein the visual representation of each of the series of timed intervals comprises an icon, wherein the icon simultaneously shows time elapsed and time left within each of the timed intervals.

In an embodiment, the method further comprises the step of: generating the visual representation of each of the plurality of timed intervals using a device selected from the group of a projector, a monitor and a television.

In an embodiment, the method further comprises the steps of: providing a first point marked within a fitness space; and providing a second point marked within the fitness space, wherein a distance between the first point and the second point is the distance a participant is required to run within each timed interval within a fitness training or testing event.

In an embodiment, the method further comprises the steps of: providing a second display, displaying the visual representation of each of the plurality of time intervals via the first display near the first point marked within the fitness space; and displaying the visual representation of each of the plurality of time intervals via the second display near the second point marked within the fitness space, wherein a participant running toward the first point is capable of viewing the visual representation of each of the plurality of time intervals via the first display and the participant running toward the second point is capable of viewing visual representation of each of the plurality of time intervals via the second display.

In an embodiment, the method further comprises the steps of: generating the visual representation of each of the plurality of time intervals with a first projector; and generating the visual representation of each of the plurality of time intervals with a second projector.

In an embodiment, the method further comprises the steps of: projecting the visual representation onto a first wall to create the first display; and projecting the visual representation onto a second wall to create the second display.

In an embodiment, the audio apparatus comprises a speaker.

In an embodiment, the control apparatus is selected from the group of a computer and a DVD player.

In an embodiment, the method further comprises the step of: sub-dividing the plurality of timed intervals into a plurality of levels, wherein each of the plurality of levels has a sub-set plurality of time intervals, wherein each of the timed intervals in each level are of the same duration.

In an embodiment, the visual representation of each of the timed intervals comprises an animation selected from the group of a circle animation and a bar animation.

It is, therefore, an advantage and objective of the present invention to provide improved visual aid timer systems and methods of using the same for use in physical interval training and testing.

Specifically, it is an advantage and objective of the present invention to provide improved visual aid timer systems and methods of using the same that provide visual signals to users thereof that are synchronized to audible signals.

More specifically, it is an advantage and objective of the present invention to provide improved visual timer systems that further provide a representation of time remaining within each interval.

Moreover, it is an advantage and objective of the present invention to provide improved visual aid timer systems and methods of using the same that may be utilized effectively by individuals that are hearing impaired, allowing them to participate in interval training that was heretofore only audible.

Further, it is an advantage and objective of the present invention to provide improved visual aid timer systems and methods of using the same that allows users to have a visual understanding of time remaining within each interval.

Still further, it is an advantage and objective of the present invention to provide improved visual aid timer systems and methods of using the same that more effectively allows users to pace themselves and obtain higher scores.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a visual aid timer system. Specifically, the visual aid timer system comprises a visual aid timer that may be displayed to users, and synchronized to an audible alert signal providing expirations of time intervals and/or indications of start and/or stop times in a plurality of intervals used in physical fitness training and/or testing. The visual aid timer system provides a visual indication of time remaining in each of the plurality of intervals for viewing by users thereof. Methods of using the same are further provided.

Figure 1:
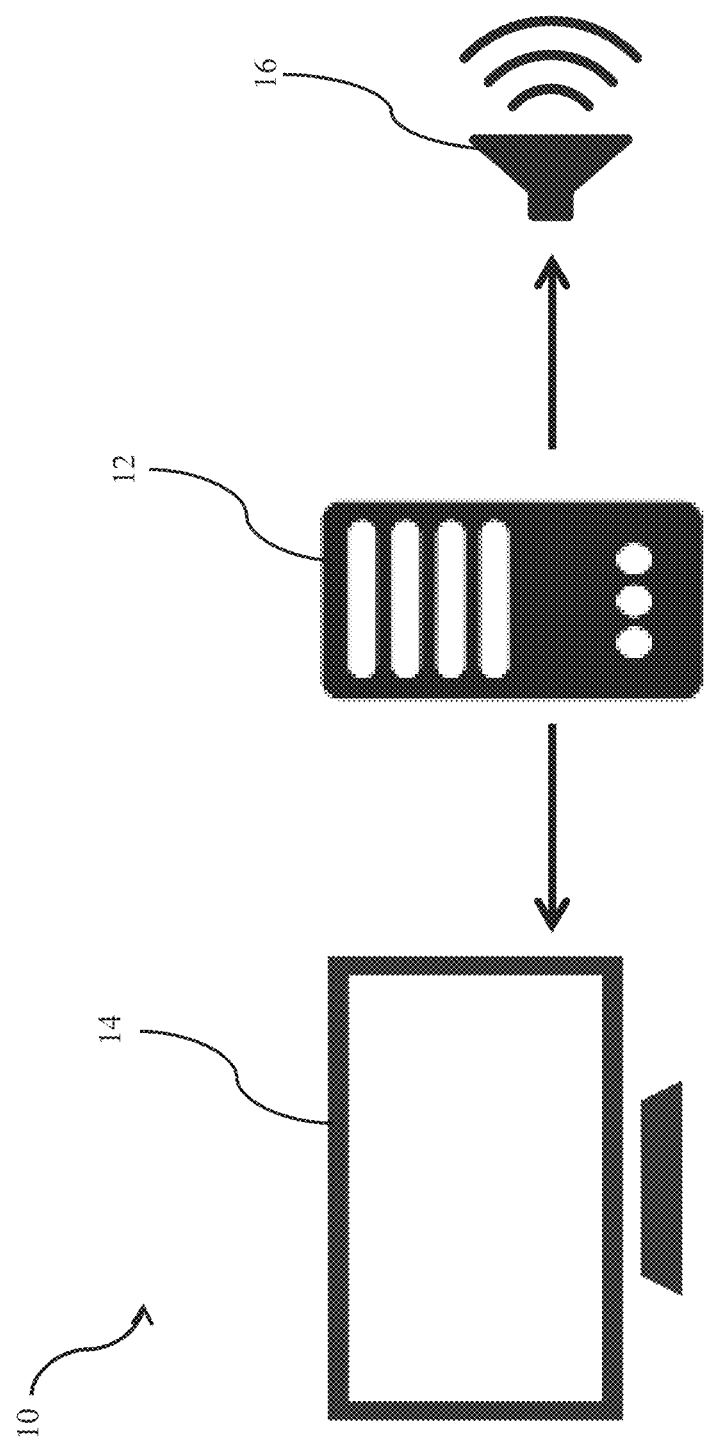
FIG. 1 illustrates a video and audio system for providing an audible signal and a visual representation of time elapsed and time remaining within a timed interval, in an embodiment of the present invention.

Now referring to the figures, wherein like numerals refer to like parts, FIG. 1 illustrates a system 10 for providing both audible and visual signals for users during fitness interval testing, such as through the PACER test. Specifically, the system 10 may comprise a control 12, such as, for example, a video and audio player 12, such as a DVD player, a computer showing video/audio files and/or having streaming capabilities, or other like video and audio player. The video and audio player may output video to a display 14 (such as a projector, a monitor, a television, or other like display device) and audio to an audio system 16 (such as, for example, one or more speakers) that is audible to participants.

In an exemplary embodiment, the video and audio may be synchronized, such that the video shows a termination of a time interval at the same time the participants hear an audible signal, such as a tone, a beep, a voice, or other like audible signal. When in use with interval training and/or testing, such as for the PACER test, the video display illustrates or otherwise shows a termination of each time interval along with a standard audible tone that also signals the termination of each time interval. Moreover, the video and audio may also demonstrate a beginning of the training or testing session, and a final termination of the training or testing session, such as providing a "start" command and an "end" command to the participants.

Figure 2A:
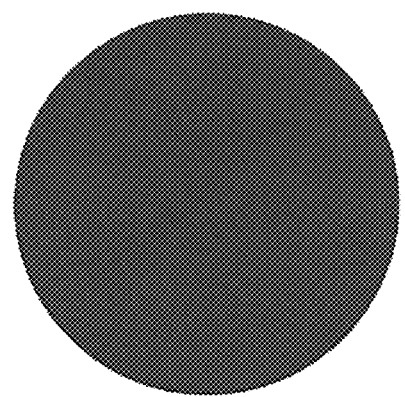
FIGS. 2A-2C illustrate a visual representation of a timed interval at various stages of time elapsed and time left in an embodiment of the present invention.
Figure 2B:
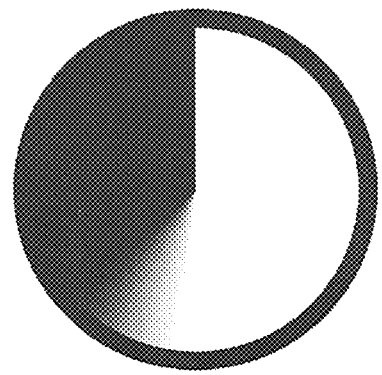
Figure 2C:
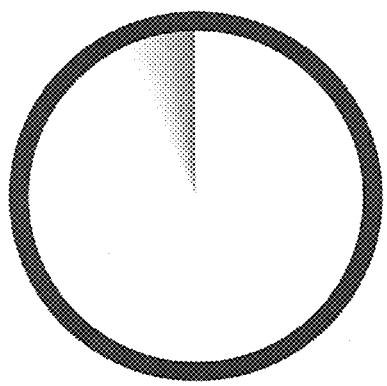

Preferably, the display may not only show the termination of the time interval, but may also show to the participants an indication of time elapsed and/or time left within each time interval. Any manner of showing time elapsed and/or time left within each time interval may be utilized; however, a preferred display is shown in FIGS. 2A-2C, which represents a "disappearing circle sweep" animation that may be utilized to show, quickly and efficiently to a participant, an amount of time elapsed within an interval and a time left within the interval. Specifically, FIG. 2A represents a full circle, indicating the start of an interval (or an end of a terminated interval). At the moment of showing the full circle, an audible tone may sound through the audio system 16 indicating the end of the prior interval/start of the new interval. FIG. 2B illustrates an amount of time that has elapsed (the white portion) and an amount of time that is left (shaded portion) within the interval. FIG. 2C illustrates that the exemplary interval is almost completed, immediately before making the audible tone and starting the next interval. Each interval shown by the "disappearing circle sweep" animation is synchronized with the audible tone such that, if the interval is longer or shorter, the animation "sweep" decreases or increases in speed, and the tone is synchronized for the end/beginning of each interval.

Figure 3:
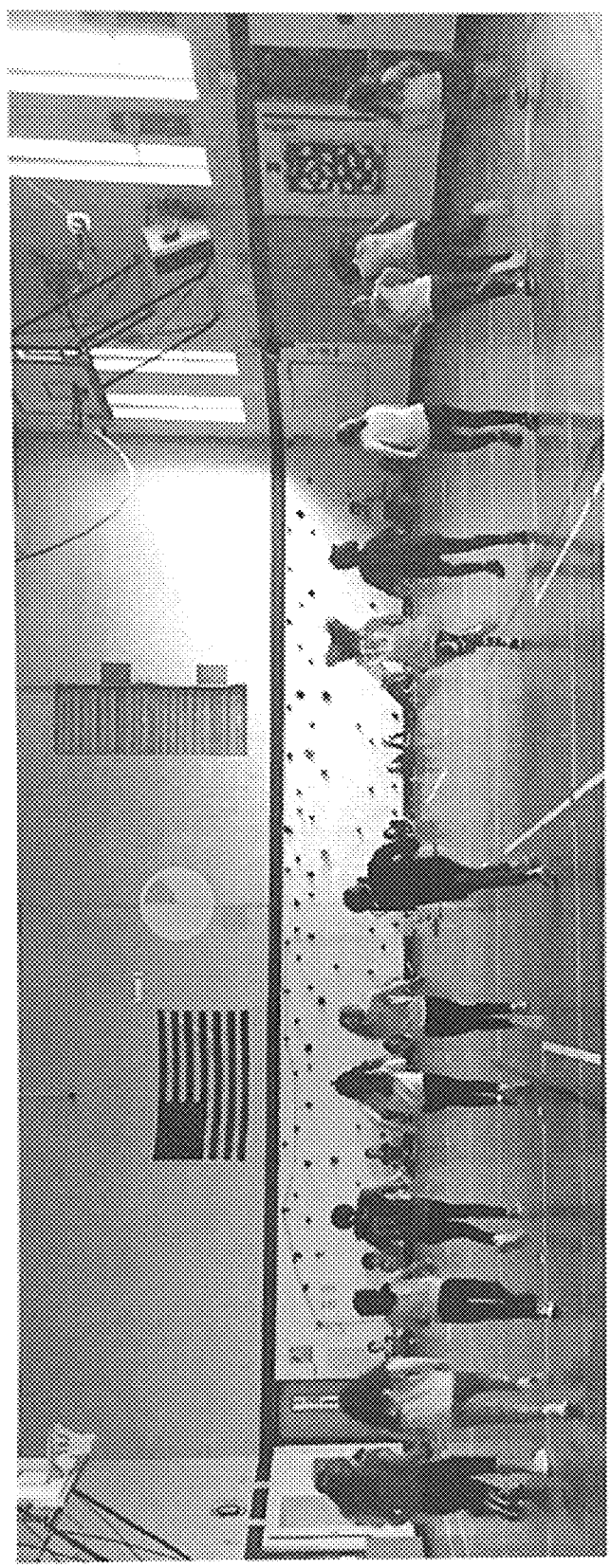
FIG. 3 illustrates a projected display of a visual representation of a timed interval for participants in fitness interval training/testing in an embodiment of the present invention.

FIG. 3 illustrates use of a projected display of the "disappearing circle sweep" animation, projected onto a wall of a gymnasium as participants are participating interval training. Preferably, the gymnasium, or other space utilized for such training and/or testing, includes a first display on one wall or on one side of the participants training and/or testing area, and a second display on a second wall or on a second side of the participants training and/or testing area. Therefore, in a training and/or testing interval such as the PACER test, where participants are required to face one direction and run between two points and subsequently are required to turn and run in the opposite direction between the two points, the visual display may be viewed by each of the participants no matter which direction they are running.

In an exemplary embodiment, the "disappearing circle sweep" animation may be created using Microsoft PowerPoint, although it should be noted that any animation software may be utilized to create the same, and the description herein is merely exemplary. Specifically, to create the animation, a black slide was created with the title "Level 1." Two circles were created of different sizes; the first circle is relatively large and of a particular color and the smaller circle is the same color as the background of the slide (in this case, black). A "wheel" animation was assigned to the smaller circle, which, when played, caused the smaller circle to rotate and disappear. The wheel animation includes a distinct line that shows the rotation and, therefore, provides an instantly recognizable indicator as to time elapsed and time left. Once the line hit the top of the circle, a beep on the audio would signify a "lap" or interval completed. The speed of the wheel animation is easily selectable and changeable depending on the timing of each interval, as well as the number of times the animation would play. Using an audio file with interval tones, the exact measurement of each animation was then assigned to the wheel animation and the number of times played was further assigned. The audio file was then embedded into the slide, thereby synchronizing the audio with the animation on the slide. Thus, Level 1 was set, and a new slide was created in the same manner for "Level 2" and so forth. When completed, the PowerPoint slide could be played on the computer and output to the video display 14 and the audio system 16. Of course, the animation may be incorporated into a separate video/audio file, burned to a DVD for use in a DVD player, or any other manner of displaying the video and playing the synchronized audio.

Of course, other animations may be utilized and the "disappearing circle sweep" animation is merely exemplary. For example, a horizontal or vertical bar may be displayed, where a line sweeps from one end of the bar to the other during the time interval to illustrate time elapsed and time remaining. Ideally, as noted above, the animation shows both a time elapsed and a time remaining in an interval, and combined with the audible signal, indicates to participants how best to pace themselves through the interval training/testing methodology.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A method of signaling time intervals in fitness tests comprising steps of:
providing a first video display for displaying a visual representation of each of a plurality of timed intervals;
providing an audio apparatus for providing an audible signal of an end or a start of each of the plurality of timed intervals; and
providing a control apparatus for displaying the visual representation and the audible signal synchronized together;
displaying the visual representation of each of the intervals in a series consecutively on the first video display and producing the audible signal on the audio apparatus, wherein the audible signal is synchronized with the visual representation of each of the timed intervals, and
wherein the visual representation of each of the timed intervals comprises a non-numerical icon, wherein the icon simultaneously shows time elapsed and time left within each of the timed intervals and further wherein the audible signal is synchronized with the start of each of the timed intervals when the icon simultaneously shows no time elapsed and a full amount of time left in each of the timed intervals;
providing a first point marked within a fitness space;
providing a second point marked within the fitness space, wherein a distance between the first point and the second point is the distance a participant is required to run within each timed interval within a fitness test event;
providing a second display;
displaying the icon via the first display near the first point marked within the fitness space, wherein the first display is configured to be viewable by a participant running toward the first point during the fitness test event;
displaying the icon via the second display near the second point marked within the fitness space, wherein the second display is configured to be viewable by a participant running toward the second point during the fitness test event;
emitting the audible signal a first time at the start of a first interval and simultaneously showing the icon, wherein the icon of the first interval represents a first amount of time of the first interval, wherein when the audible signal is emitted the first time the icon shows no time elapsed and a full amount of time left within the first interval, and further wherein as time elapses in the first interval the icon of the first interval shows time elapsing at a first rate; and
emitting the audible signal a second time at the start of a second interval immediately after the icon shows full time elapsed and no time left within the first interval, wherein the icon of the second interval represents a second amount of time of the second interval different from the first amount of time, wherein when the audible signal is emitted the second time the icon shows no time elapsed and a full amount of time left within the second interval, and further wherein as time elapses in the second interval the icon of the second interval shows time elapsing at a second rate different from the first rate.

2. The method of claim 1 further comprising the step of:
generating the visual representation of each of the plurality of timed intervals using a device selected from the group of a projector, a monitor and a television.

3. The method of claim 1 further comprising the steps of:
generating the visual representation of each of the plurality of time intervals with a first projector; and
generating the visual representation of each of the plurality of time intervals with a second projector.

4. The method of claim 3 further comprising the steps of:
projecting the visual representation onto a first wall to create the first display; and
projecting the visual representation onto a second wall to create the second display.

5. The method of claim 1 wherein the audio apparatus comprises a speaker.

6. The method of claim 1 wherein the control apparatus is selected from the group of a computer and a DVD player.

7. The method of claim 1 further comprising the step of:
sub-dividing the plurality of timed intervals into a plurality of levels, wherein each of the plurality of levels has a sub-set plurality of time intervals, wherein each of the timed intervals in each level are of the same duration.

8. The method of claim 1 wherein the visual representation of each of the timed intervals comprises an animation selected from the group of a circle animation and a bar animation.

* * * * *